United States Patent
Mistro

(10) Patent No.: US 7,787,877 B2
(45) Date of Patent: Aug. 31, 2010

(54) METHOD AND APPARATUS OF AVOIDING AUDIO TRUNCATION IN TRUNKED SYSTEMS

(75) Inventor: John T. Mistro, Carol Stream, IL (US)

(73) Assignee: Motorola, Inc., Schaumburg, IL (US)

( * ) Notice: Subject to any disclaimer, the term of this patent is extended or adjusted under 35 U.S.C. 154(b) by 386 days.

(21) Appl. No.: 11/411,252

(22) Filed: Apr. 26, 2006

(65) Prior Publication Data

US 2007/0254645 A1  Nov. 1, 2007

(51) Int. Cl.
*H04Q 7/20* (2006.01)
(52) U.S. Cl. .............. 455/426.1; 370/390; 455/518
(58) Field of Classification Search .............. None
See application file for complete search history.

(56) References Cited

U.S. PATENT DOCUMENTS

| 6,298,058 | B1 | 10/2001 | Maher | |
|---|---|---|---|---|
| 6,647,020 | B1 | 11/2003 | Maher | |
| 7,346,053 | B1 * | 3/2008 | Leung et al. | 370/390 |
| 2004/0037237 | A1 | 2/2004 | Lalwaney | |
| 2006/0246933 | A1 * | 11/2006 | Na et al. | 455/518 |

OTHER PUBLICATIONS

PCT Search Report Dated Sep. 12, 2008.
Australian Rejection Dated Jan. 13, 2010.

* cited by examiner

*Primary Examiner*—Lester Kincaid
*Assistant Examiner*—Phuoc Doan
(74) *Attorney, Agent, or Firm*—Indira Saladi; Terri S. Hughes

(57) ABSTRACT

A method and apparatus are provided for reducing audio truncation during a call in a trunked radio system. The method includes the steps of providing a multicast IP address of a rendezvous point to a first participant of the call to forward multicast audio of the call to a second participant of the call and using a dummy host to add an IP address for the second participant to the multicast IP address of the rendezvous point.

16 Claims, 1 Drawing Sheet

METHOD AND APPARATUS OF AVOIDING AUDIO TRUNCATION IN TRUNKED SYSTEMS

FIELD OF THE INVENTION

The field of the invention relates to communication systems and more particularly to trunked communication systems.

BACKGROUND

Trunked communication systems are generally known. Such systems are typically used as a primary mode of communication by organizations where mainly short messages are exchanged (e.g., police, firemen, sewer workers, servicemen, etc.).

Trunked radios are typically operated under a simplex format. Under a simplex format a single radio channel is used to both transmit and receive messages.

Radios used in trunked systems are typically associated with talk groups and support talk group calls. In addition, radios used in trunked systems may also support private calls. A talk group is generally defined as a group of users within a certain geographic area or areas and is usually defined by a system operator of the trunked system. For example, a system operator may define a talk group for police officers serving the same geographic area.

Messages between members of a talk group may be accomplished by a user of the radio simply activating a microphone button and speaking into the microphone. Upon activation of the microphone button, the radio transmits a radio identifier and/or talk group identifier to a zone controller. The zone controller identifies the talk group, locates other members of the talk group and retransmits audio to the other members of the talk group as the user begins speaking. Typically this is accomplished by allocating a repeater within each service coverage area in support of the transmission.

While trunking systems work relatively well, they are limited in their ability to operate over multiple zones. Where multiple zones are involved, the channel setup time may be too long and audio information may be lost (also known as "audio truncation"). Accordingly, a need exists for a method and apparatus for setting up trunked calls across multiple zones.

DETAILED DESCRIPTION

Figure 1:
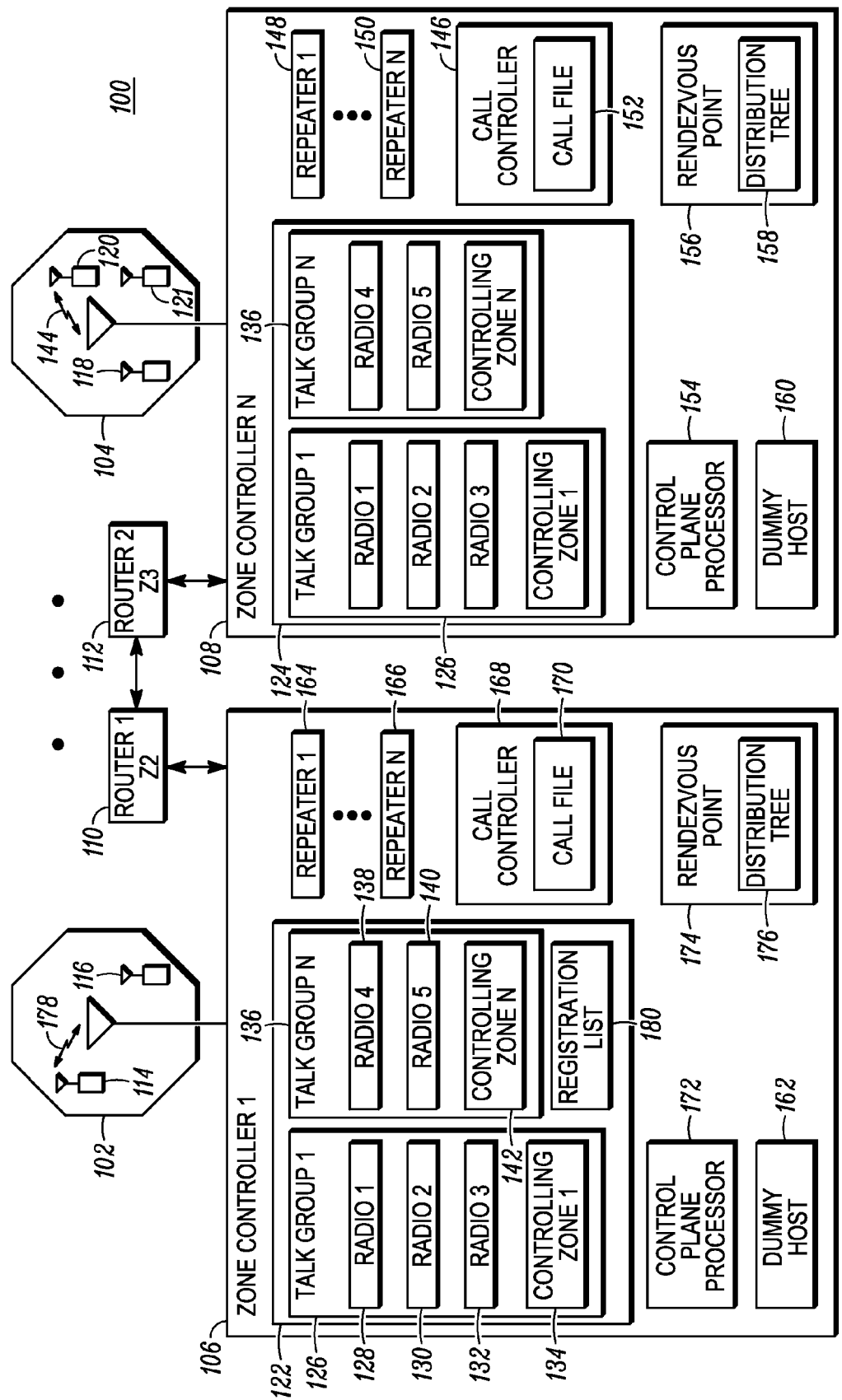
FIG. 1 is a block diagram of a trunked communication system in accordance with illustrated embodiments of the invention.

In large (e.g., nationwide) trunking systems that use multicast IP and a sparse mode multicast routing protocol, communication among radio devices relies upon the set up and use of a multicast tree. However, where communication devices are located in multiple service areas, a communication device may begin sending audio before the multicast tree can be set up. In this case, one or more of the audio packets will be dropped by the network and radios will experience audio truncation.

FIG. 1 shows a trunked radio communication system 100 that addresses this problem under an illustrated embodiment of the invention. The system 100 uses a method of reducing audio truncation that includes the steps of providing a multicast IP address of a rendezvous point to a first participant of the call to forward multicast audio of the call to a second participant of the call and using a dummy host to add an IP address for the second participant to the provided rendezvous point. As used herein, a dummy host is a processor associated with a service coverage area (e.g. 102) and in one embodiment, may be located at a zone controller associated with the service coverage area. In one embodiment, the dummy host registers a "join multicast group" (JOIN) message with the rendezvous point in place of the second participant. Similarly, a rendezvous point has a multicast Internet Protocol address from which multicast audio information is distributed.

The system 100 provides service within a number of service coverage areas 102, 104. While two service coverage areas 102, 104 are shown in FIG. 1, it should be understood that any number of service coverage areas 102, 104 may be serviced by the system 100.

Associated with each service coverage areas 102, 104 is a zone controller 106, 108. As shown in FIG. 1, a first zone controller 106 may be associated with a first service coverage area 102 and a second zone controller 108 may be associated with a second service coverage area 104.

In general, the zone controllers 106, 108 may be interconnected by one or more routers 110, 112 operating under an Internet protocol (IP). While operating under an Internet protocol, the routers 110, 112 (and system 100) are not part of the Internet. In addition, while the routers 110, 112 are shown as being separate from the zone controllers 106, 108, it should be understood that each service coverage area would have its own router and that communication over large distances would usually occur through a series of interconnected routers.

Communication within the system 100 typically occurs among members of a talk group (TG). In the case of a trunked communication system 100 associated with public safety, the TG may include members of a specific organization (e.g., members of a police department, fire department, etc.).

In order to coordinate communication activity, a zone controller is typically selected as a controlling zone controller for a TG. For example, the first zone controller 106 may be designated as the controlling zone for a first TG (TG1) that includes radio communication units 114, 116, 118. Similarly, a second zone controller 108 may be designated as the controlling zone for a second talk group (TG2) that includes communication units 120, 121.

Within a memory 122, 124 of each zone controller 106, 108 may be a list of TGs and the controlling zone for that TG. For example, the first and second zone controllers 106, 108 may contain a talk group list 126 for TG1 that includes identifiers 128, 130, 132 of radios 114, 116, 118 and that includes an identifier 134 of zone controller 106 as the controlling zone. Similarly, the first and second zone controllers 106, 108 may contain a talk group list 136 for TG2 that includes identifiers 138, 140 of radios 120, 121 and an identifier 142 of the second zone controller 108 as the controlling zone.

To initiate a call, a user of a radio (e.g., 120) may activate a press-to-talk (PTT) button (not shown) on the radio 120 and begin speaking. Activation of the PTT button causes the radio to transmit an access request over a radio frequency (RF) link 144 on a control channel used within the service coverage area 104 to a call controller 146 within the zone controller 108. The access request 144 may include an identifier of the radio 120 as well as an identifier of the TG of the radio 120. By reference to the talk group lists 126, 136, the call controller 146 may determine that the radio 120 is authorized to operate in the service coverage area 104.

In response, the call controller 146 may assign a unique identifier to the call, allocate a radio frequency channel for use by the radio 120 and assign a repeater 148 to service the call. The call controller 146 may then transmit a call grant message over the RF link 144 instructing the radio to tune to the allocated channel. The call controller 146 may also instruct the repeater 148 to tune to the channel and begin receiving audio from the radio 120.

The call controller 146 may also create a call file 152 that includes the call identifier, an identifier of the allocated channel and an identifier of the TG. The call controller 146 may transfer the call file to a control plane processor 154.

In response, the control plane processor 154 may recognize via the talk group list 136 that zone controller 108 is the controlling zone and may begin to take steps to set up a voice connection among radios 120, 121 within the TG on the audio plane. As a first step, the control plane processor 154 may configure a rendezvous point (RP) 158 at a selected multicast IP address of the RP 158. Configuration of rendezvous points 158 may be better understood by reference to publication number RFC2362 entitled "Protocol Independent Multicast-Sparse Mode (PIM-SM): Protocol Specification" and is available from the Network Working Group.

The control plane processor 154 may also send a call grant to surrounding zone controllers (e.g., 106) identifying the TG of the call in the event that other members of the TG are located in those zones. In response, the other members of the TG may respond with a JOIN message. The receipt of a JOIN message from other members of the TG (e.g., radio 121) causes the IP addresses of the repeaters that serve the radios to be added to the rendezvous point distribution tree 158 of the RP 156.

In this first simplistic example, once the radio 121 has been added to the RP 156 and tree 158, audio from the first radio 120 may be distributed to the second radio 121. Since the first and second radios 120, 121 are in the same service area 104 there is no truncation of audio information. However, if the radio 121 had been in another service coverage area (e.g., 102), then the alert would require a finite time period to reach the radio 121 and another finite time period for the JOIN to be received by the RP 158. As mentioned in the background, until the IP address of the repeater that serves the radio 121 is added to the tree 158, audio could not be distributed to the radio 121.

In order to solve the problem of audio truncation, one or more dummy hosts 160, 162 is provided within each of the zone controllers 106, 108. The control plane processor 154 may also be provisioned to register the presence of radios controlled from other zones with the controlling zone. If the controlling zone is greater than a predetermined distance (as determined from the time delay measured by pinging the registering zone), then the controlling zone immediately sets up a RP 156, 174 and instructs the registering zone to assign a dummy host 160, 162 to the registering radio. Once assigned, the dummy host 160, 162 immediately sends a JOIN multicast group message to the RP 156, 174 in anticipation of a call.

As a further more detailed example, a radio 118 of TG1 enters the service coverage area 104 and transmits a remote registration message to the call control processor 146 of the second zone controller 108. The call control processor 146 recognizes from the list 126 that the radio 118 is a foreign radio controlled by another zone controller 106. In response, the call controller 146 transfers a registration message including the identifier of the radio 118 and/or a TG identifier to a call controller 168 of the controlling zone 106.

Upon receipt of the registration message, the call controller 168 of the controlling zone 106 selects a multicast IP address and configures a rendezvous point 174 at the selected multicast IP address. The call controller 168 also sends a message to the registering zone controller 108 (including the identifier of the radio 118 and/or TG and the multicast IP address of the rendezvous point 174) to the call controller 146 instructing the call controller 146 to assign a dummy host 160 for the radio 118. In response, the dummy host 160 is assigned and, in turn, sends a JOIN message to the IP address of the RP 174. Upon receipt of the JOIN message, the RP 174 adds the IP address of the dummy host 160 to the distribution tree 176.

Subsequently a user of a radio (e.g., 114) of the same talk group may activate the PTT button and transmit an access request 178 to the zone controller 106. In response, the call controller 168 allocates a channel and sends a call file 170 to a control plane processor 172.

By reference to the TG list 126, the control plane processor 172 recognizes that this call is associated with TG1 and that a RP 174 has already been configured for the call. In response, the control plane processor 172 may send out a call grant to the repeaters that serve radios 114, 116, 118 of TG1 using the multicast IP address of the RP 174.

The repeaters that serve the radios 114, 116 are added to the rendezvous point tree 174 and audio is distributed among TG1. Since radio 118 has already registered, any JOIN message from the repeater that serves the radio 118 may be discarded. Also since the dummy host 160 that serves the radio 118 is already joined with the RP 174 there is no loss of audio when the radio 114 begins transmitting audio.

In another embodiment, the system 100 may be used for private calls. In order to avoid audio truncation, the use of the dummy host may be altered to accommodate the call set up sequence of private calls.

In such a case, the user of the radio 114 may enter an identifier of another radio (e.g., 120) and activate a "MAKE CALL" button on the radio 114. In response, the radio 114 may transmit an access request over an RF link 178 to the call controller 168. The call controller 168 may receive the access request over the RF link 178 and take steps to set up the connection. The call controller 168 may verify the right of the radio to make the call in the service coverage area 102 and transfer a call file 170 (including the identifier of the called radio 120) to the control plane processor 172.

By reference to registration list 180, the control plane processor 172 may identify the zone controller 108 as the controlling zone for the called radio 120. The control plane processor 172 may transfer a call grant to the zone controller 108 including a call identifier and indication that the call is a private call. The control plane processor 172 may also assign a dummy host 162 to the call.

Within the zone controller 108, the call grant may be received by the control plane processor 154. The control plane processor 154 may create a call file 152 including an identifier of the caller and callee and the fact that the call is a private call and transfer the call file 152 to the call controller 146.

The call controller 146 allocates a repeater 150 and sends a ring message to the radio 120 on a control channel. The radio 120 may begin ringing and return an acknowledgement (ACK) message. The call controller 146 may return the ACK message to the control plane processor 154.

In response to the ACK message, the control plane processor 154 may configure a rendezvous point 156 for the call. The configuration, in this case, is provided in the event that the callee on radio 120 should answer the call and because of the delay that would follow the answering of the call on radio 120.

In addition to configuring the RP 156, the control plane processor 154 may send an ACK message back to the control plane processor 172 within the originating zone controller 106. The ACK message may include an identifier of the call and/or caller, the callee and the multicast IP address of the RP 156.

Upon receipt of the acknowledgement message, the control plane processor 172 forwards the acknowledgement message to the dummy host 162. In response, the dummy host 162 sends a JOIN message to the multicast IP address of the RP 156. The RP 156 adds the IP address of the dummy host 162 (and, inherently, the IP address of the caller) to the distribution tree 158.

In the event that the callee answers the call on radio 120, the call controller 146 sends an answer message, including an identifier of the callee and/or call, to the control plane processor 154. The control plane processor 154 recognizes from the identifier that an RP 156 has already been set up and instructs the repeater 150 to begin coupling audio to the RP 156. The RP 156, in turn, couples audio from the callee on radio 120 to the caller on radio 114.

The zone controllers 106, 108 may assign a dummy hosts 160, 162 under any of a number of different scenarios. For example, if a registering zone is separated from a home zone by more than three routers 110, 112, then the use of a dummy host 160, 162 (and set up of a rendezvous point in advance of a call) would occur automatically whenever a member of a talk group registered. Alternatively, the controlling zone may ping the registering zone and if the round-trip time delay exceeds some threshold value, then the home zone may request the assignment of a dummy host 160, 162 to a call.

Specific embodiments of methods and apparatus for reducing audio truncation have been described for the purpose of illustrating the manner in which one possible alternative of the invention is made and used. It should be understood that the implementation of other variations and modifications of embodiments of the invention and its various aspects will be apparent to one skilled in the art, and that the various alternative embodiments of the invention are not limited by the specific embodiments described. Therefore, it is contemplated to cover all possible alternative embodiments of the invention and any and all modifications, variations, or equivalents that fall within the true spirit and scope of the basic underlying principles disclosed and claimed herein.

The invention claimed is:

1. A method of reducing audio truncation during a call in a trunked radio system comprising:
   at a first controller:
   receiving an access request message for a first radio from a second controller;
   upon receipt of the access request message, transmitting a ring message to the first radio;
   receiving an acknowledgment message from the first radio;
   selecting a multicast IP address and configuring a rendezvous point at the multicast IP address; and
   instructing the second controller to assign a dummy host, having an IP address, for a second radio such that the rendezvous point adds the IP address of the dummy host to a distribution tree prior to the start of the call in order to reduce audio truncation at the first radio,
   wherein the instructing step is performed upon a determination that the first controller is separated from the second controller by more than three routers, or that a round-trip time delay between the first controller and the second controller exceeds a threshold.

2. The method of reducing audio truncation as in claim 1 further comprising transmitting the acknowledgement message to the second controller.

3. The method of reducing audio truncation as in claim 2 wherein the step of instructing is part of the acknowledgement message that is transmitted to the second controller.

4. The method of reducing audio truncation as in claim 1 wherein the access request message indicates that the call is a private call.

5. The method of reducing audio truncation as in claim 1 wherein the second controller assigns the dummy host to the call when the second controller transmits the access request message to the first controller.

6. The method of reducing audio truncation as in claim 1 wherein the dummy host comprises a processor associated with a different coverage area from the first controller.

7. The method of reducing audio truncation as in claim 1 wherein the dummy host is located in the second controller.

8. The method of reducing audio truncation as in claim 1 further comprising forwarding the multicast IP address of the rendezvous point to the second controller.

9. The method of reducing audio truncation as in claim 8 wherein the dummy host sends a JOIN message to the rendezvous point via the multicast IP address.

10. A method of reducing audio truncation during a call in a trunked radio system comprising:
    at a first controller:
    receiving a registration message for a first radio that is affiliated with a talkgroup from a second controller;
    upon receipt of the registration message, selecting a multicast IP address and configuring a rendezvous point at the multicast IP address for the talkgroup; and
    instructing the second controller to assign a dummy host, having an IP address, for the first radio such that the rendezvous point adds the IP address of the dummy host to a distribution tree prior to the start of the call in order to reduce audio truncation at the first radio,
    wherein the instructing step is performed upon a determination that the first controller is separated from the second controller by more than three routers, or that a round-trip time delay between the first controller and the second controller exceeds a threshold.

11. The method of reducing audio truncation as in claim 10 further comprising forwarding the multicast IP address of the rendezvous point to the second controller.

12. The method of reducing audio truncation as in claim 11 wherein the dummy host sends a JOIN message to the rendezvous point via the multicast IP address.

13. The method of reducing audio truncation as in claim 10 further comprising:
    receiving an access request from a second radio to make the call;
    allocating a channel for the call; and
    if the call is associated with the first talkgroup, transmitting a call grant to the second controller using the multicast IP address of the rendezvous point.

14. The method of reducing audio truncation as in claim 10 wherein the dummy host comprises a processor associated with a different coverage area from the first controller.

15. The method of reducing audio truncation as in claim 10 wherein the dummy host is located in the second controller.

16. The method of reducing audio truncation as in claim 10 further comprising sending a call grant message with the dummy host added to a distribution tree.

* * * * *